(12) United States Patent
Lowe et al.

(10) Patent No.: US 6,539,082 B1
(45) Date of Patent: Mar. 25, 2003

(54) BILLING SYSTEM

(75) Inventors: Colin Lowe, Suffolk (GB); Nicolae Marius Busuioc, Suffolk (GB); Nigel Geoffrey Dadge, Suffolk (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/673,856

(22) PCT Filed: May 7, 1999

(86) PCT No.: PCT/GB99/01429
§ 371 (c)(1),
(2), (4) Date: Oct. 23, 2000

(87) PCT Pub. No.: WO99/59350
PCT Pub. Date: Nov. 18, 1999

(30) Foreign Application Priority Data

May 13, 1998 (EP) ............................................. 98303817

(51) Int. Cl.[7] ............................................. H04M 15/00
(52) U.S. Cl. ............................. 379/114.28; 379/114.29; 379/114.14; 379/114.01; 379/126; 379/121.01
(58) Field of Search ............................ 379/114.14, 145, 379/189, 114.01, 126, 127.02, 121.04, 119, 120, 114.29, 114.28, 32.01, 32.02, 221.08, 221.09, 221.12

(56) References Cited

U.S. PATENT DOCUMENTS

| | | | |
|---|---|---|---|
| 5,008,929 A | | 4/1991 | Olsen et al. |
| 5,506,893 A | * | 4/1996 | Buscher et al. ............. 379/114 |
| 5,579,371 A | | 11/1996 | Aridas et al. |
| 5,592,530 A | * | 1/1997 | Brockman et al. ............ 379/34 |
| 5,881,132 A | * | 3/1999 | O'Brien et al. ................ 379/35 |
| 5,970,129 A | * | 10/1999 | Afshar et al. ................ 379/144 |
| 6,243,453 B1 | * | 6/2001 | Bunch et al. ................ 379/201 |
| 6,381,306 B1 | * | 4/2002 | Lawson et al. .......... 379/32.01 |
| 6,400,813 B1 | * | 6/2002 | Birnhak ...................... 379/133 |

* cited by examiner

Primary Examiner—Rexford Barnie
(74) Attorney, Agent, or Firm—Nixon & Vanderhye P.C.

(57) ABSTRACT

A billing system for a telecommunications network uses a monitoring software agent to monitor messages, indicative of individual calls on the network, passing between a service switching point and a service control point. Call record information is extracted and is stored in a local call record database. Information from each call record database is then passed on to a central database, using updating mobile agents, the central database being accessible to such agents and report building agents which can extract billing information as requested by an operator. By monitoring the messages as they pass, the system can provide real time billing information without needing to poll the switch at the service switching point.

15 Claims, 4 Drawing Sheets

BILLING SYSTEM

BACKGROUND OF THE INVENTION

1. Field of the Invention

This invention relates to a billing system. In particular, this invention relates to a billing system for billing customers to a telecommunications network.

2. Description of Related Art

A known telecommunications network is shown in FIG. 1. This includes a plurality of telephones (7), each of which is connected to one of a plurality of local exchanges (9). Connected to the local exchanges (9) are transit exchanges (11) that are provided for routing calls between the local exchanges (9).

On lifting a handset of one of the telephones (7) the user hears a dialling tone and dials the number of the person to be contacted. The dialled codes are decoded at the local exchange (9) and the call is routed to the appropriate destination. Any services such as call diversion, alarm-call, call waiting, etc are controlled by software that resides on the local exchanges (9). This means that the modification of these services and the introduction of new services are time-consuming.

FIG. 2 shows another telecommunications network (13) of the type that has become known as an Intelligent Network (IN). This is similar to that shown in FIG. 1, except that in this case each local exchange (9) is additionally connected to a Service Control Point (SCP) (15) and an Intelligent Peripheral (IP) (17). Alternatively, the IP may be located within the local exchange (9).

Contained in the SCP (15) are Service Logic Programs (SLPs) that control advanced network services while the Intelligent Peripheral is used to play recorded announcements to callers and collect information from them during the operation of the services. Having the software that controls operation of services located in the SCP (15) and not the customers' local exchange (9) means that new services can be introduced and modified across the entire network in relatively short periods of time.

Typically, the local exchanges (9), and possibly the transit exchanges (11), are enhanced so that they have the capability to detect the occurrence of certain events over the whole duration of the call, i.e. from call set up to the call being terminated. The local exchanges (9) report these to the SCP (15). Exchanges (9) with such a reporting capability are known as Service Switching Points (SSP).

When a call is made on the network and the SSP (9) recognises that the call requires an Intelligent Network service, it opens a dialog with the SCP (15). Information is then sent to the SCP (15) and subsequent instructions are sent from the SCP (15) in order to connect the call. The process of the SSP (9) recognising that the call requires an intelligent network service and initiating a dialog with the SCP (15) is known as "triggering". A trigger can occur in the SSP (9) at a number of points within a call, for example on detection of the caller going off-hook, detection of certain sequences of dial digits, detection of the called party being busy or not answering or detection of a sequence of digits being dialled whilst the call is in the speech phase. When such a trigger point is reached, the SSP (9) suspends normal call processing and exports a number of parameters (such as service identity, dialled number, calling number, trigger detection point) to the SCP (15) in what is known as Initial Detection Point operation (IDP).

On receipt of an IDP the SCP (15) invokes the identified service logic programme and sends any necessary instructions to the SSP (9). The SSP (9) carries out these instructions which can range from monitoring the network for occurrence of call events to connecting the caller to the IP (17) and then to the destination telephone (7). When the dialog between the SSP (9) and the SCP (15) is complete, normal processing of the call resumes.

It is also possible for the SCP (15) to initiate calls by sending a message to the SSP (9) instructing it to call a telephone (7). When this telephone (7) is answered the event can be reported to the SCP (15) which can then instruct the SSP (9) to connect the called person to an announcement or another telephone.

In order to calculate bills for customers using the intelligent network of FIG. 2, information is sent to the SSPs (9) from the SCP (15) to populate call information records in the SSPs (9). Connected to each SSP is a Network Mediation Processor (NMP) (17) as is shown in FIG. 3. Each NMP (17) polls the switch at designated times for the call information records, usually around midnight when communication traffic on the switch is at a minimum. This minimises disruption on the network. The information obtained by the NMPs (17) is stored in platform independent usage records (PIURS) which are then passed onto a Service Domain Processor (SDP) (19), which acts effectively as a pricing engine. The SDP (19) contains information on the pricing structure for calls and calculates the price of each of the calls in the PIURS passed onto it. The priced PIURS are then passed onto a computer support system (CSS) (21) that normalises the PIURS into a form that is IBM compatible, works out which account each call belongs to, and calculates the final bill. This final calculation takes into account any discounts that the customer is entitled to, for example, the BT friends and family discount. The final bill image is then stored in a central billing database (23) ready for distribution to the customer.

Whilst this known billing system is reliable and accurate, information is only collected once per day. Increasingly, there is a need for a system with real-time billing capability.

BRIEF DESCRIPTION OF THE INVENTION

According to first output of the invention there is provided a billing system for a telecommunications network, the network comprising a plurality of service switching points in communication with a service control point arranged to control network services, and a call monitor arranged to monitor messages indicative of individual calls on the network, passing between the service control point and one of the service switching points, and to place information indicative of the monitored messages into a call record database.

According to another aspect of this invention there is provided a billing system for a telecommunications network, the telecommunications network comprising a plurality of local exchanges for providing services to users of the network, the local exchanges each being connected to service control means that contains programs for controlling network services, wherein the billing system comprises monitoring means for monitoring the network, the monitoring means being connected between the local exchanges and the service control means and a central processor connected to the monitoring means, wherein the monitoring means monitors the network using a monitoring agent that gathers information relating to calls made on the network as those calls are made and an updating agent is provided to place the information found by the monitoring agent in a central database in the central processor.

An advantage of the billing system in which the present invention is embodied is that real time billing information can be obtained.

Preferably, there is a plurality of monitoring means, each of which is associated with one local exchange. Preferably, the monitoring means includes a local call record database, wherein the monitoring agent places call record information in the call record base and the updating agent reads information from the local call record database and transfers that information to the central database in the central processor.

Preferably, each of the monitoring and the updating agents is mobile.

Typically, an operator interface is provided to enable access to information in the said central database, the operator interface being connected to the central processor. Preferably, the operator interface includes an interface agent for interpreting instructions from an operator and accordingly constructing a query for the central database. Typically, a searching agent is provided for searching for customer billing information in response to a query from an operator. Preferably the searching agent is mobile and can move between the operator interface and the central processor.

Preferably, a report-building agent is provided for building reports of the findings of the searching agent, and calculating the customer's bill from the results of the operator query. Preferably, the report building agent presents the results of the query to the operator.

Typically, fraud detection means are provided for detecting fraudulent calls on the network. Preferably, the fraud detection means is operable to send instructions to the exchanges to block numbers to which fraudulent calls are being made.

According to a further aspect of the invention there is provided a method of providing real-time billing information in a telecommunications network, the network comprising a plurality of service switching points in communication with a service control point arranged to control network services, the method comprising:
  (a) monitoring messages indicative of individual calls on the network, passing between the service control point and one of the service switching points, and
  (b) updating a call records database with information indicative of the monitored messages.

According to another aspect of the present invention there is provided a method for providing real time billing information in a telecommunications network, the network comprising a plurality of local telephone exchanges for providing services to users of the network, the local telephone exchanges being connected to service control means that contain programmes that control network services, wherein the method comprises the steps of:
  monitoring the network between the local telephone exchanges and the service control means for new call records using a monitoring agent that gathers information relating to calls made on the network as those calls are made and
  updating a central database with information relating to any new calls when they are detected by the monitoring agent using an updating mobile agent.

Preferably the method includes the further step of accessing the said database from an operator interface, which is connected to the central database server. Preferably, the method further involves interpreting instructions from the operator using an interface agent, and accordingly constructing a query for the database.

Preferably, the method further involves searching for customer billing information using a searching agent in response to a query from an operator. Preferably, the searching agent is mobile and can move between the operator interface and the central database server. Preferably, the method includes the step of building reports of the findings of the searching agent using a building agent and calculating the customer's bill from the results of the operator query. Preferably, the report building agent presents the results of the query to the operator.

BRIEF DESCRIPTION OF THE DRAWINGS

A system and method in which the present invention is embodied will now be described by way of example only, with reference to and as shown in the following drawings.

DETAILED DESCRIPTION OF EXEMPLARY EMBODIMENTS

Figure 1:
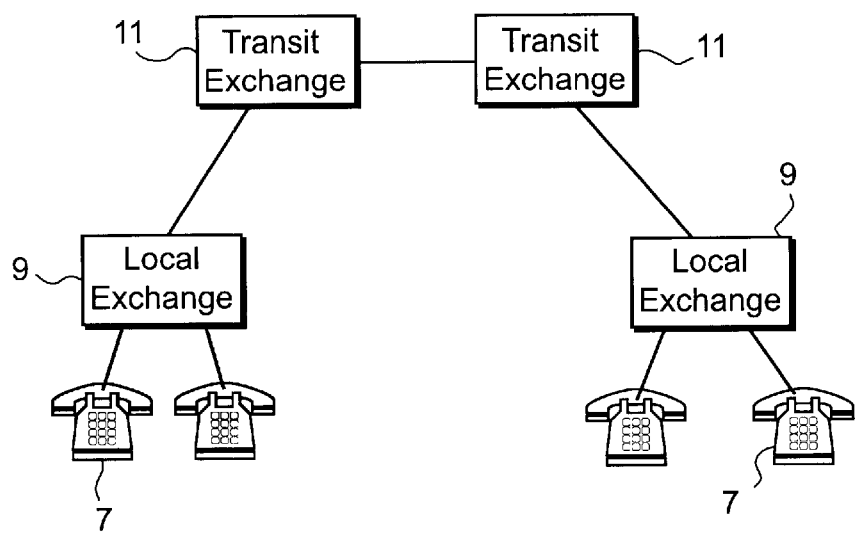
FIG. 1 is schematic representation of a standard telecommunications network.
Figure 2:
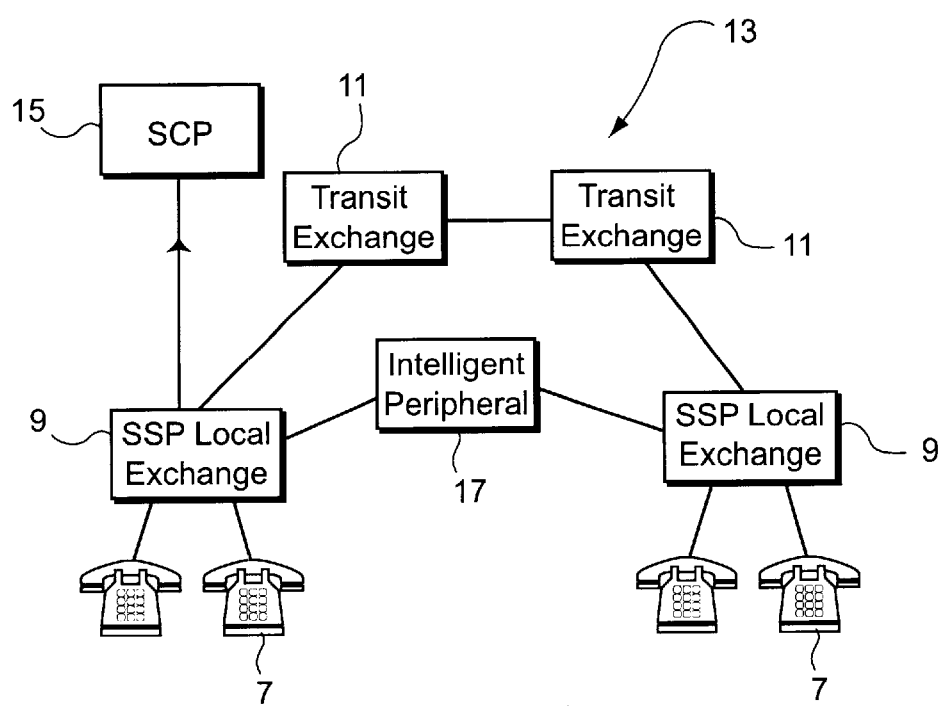
FIG. 2 is a schematic representation of a known intelligent telecommunications network.
Figure 3:
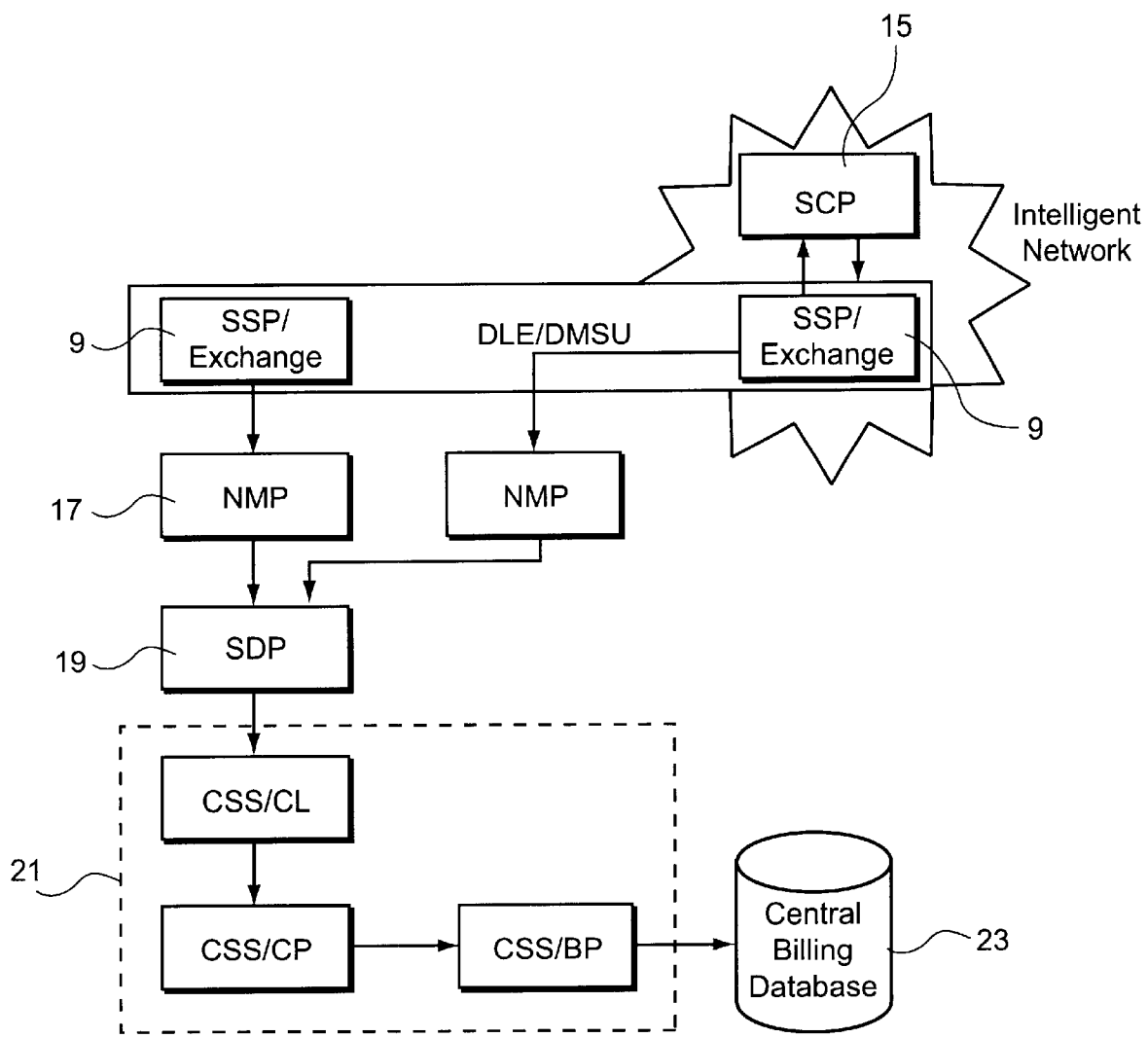
FIG. 3 is a schematic representation of a known billing system.
Figure 4:
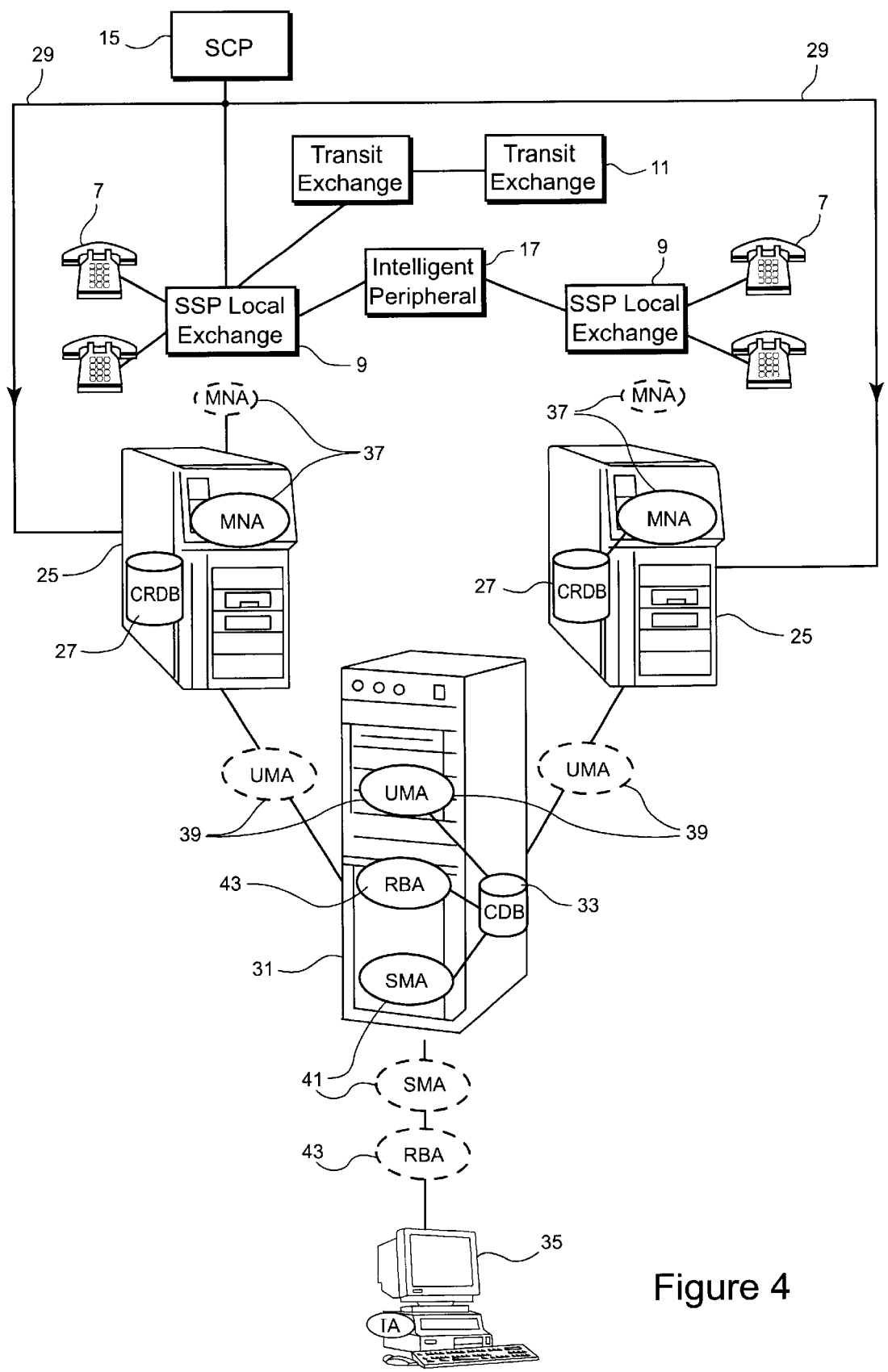
FIG. 4 is a schematic representation of a billing system in which the present invention is embodied.

FIG. 4 shows an intelligent telecommunications network that has a plurality of telephones (7) connected to two local exchanges/SSPs (9), each of which is connected to a service control point (SCP) (15). Typically, for example, the SCP (15) is a Siemens Nisxdorf RM600, with 8 CPU cards per half, with the SCP node made up of two halves. Each of the SSPs (9) is able to detect the occurrence of certain events over the whole duration of a call and report these to the SCP (15).

Associated with each SSP (9) is a switch side processor (25) that contains a local call record database (CRDB) (27) and is connected via a C7 link (29) to the SCP (15), the C7 protocol being part of the International standard SS7 signalling protocol. Connected to each of the switch side processors (25) is a central database server (31), in which is provided a central database (CDB) (33) for storing information from all the local call records databases (27). Connected to the central database server (31) is an intelligent interface in an operator terminal (35) to enable an operator to obtain billing information from the central database (33).

Communication between the switch side processors (25) and the SCP (15), the switch side processors (25) and the central database server (31) and additionally the central database server (31) and the operator interface (35) is effected using software agents.

Agents are pieces of software that act as "problem solvers". These are autonomous in nature and may be heterogeneous. Each agent has a local view of its environment and is able to respond to changes locally. The billing system shown in FIG. 4 is a multi-agent system. Such systems have been defined in the article "*Trends in Cooperative Distributed Problem Solving*", IEEE Trans. Knowl. Data Eng., KOE-11(1), pp. 63–83, 1989 by Durfee, E., H., Lesser, V., R., Corkill, D., D., as " . . . a loosely coupled network of problem solvers that work together to solve problems that are beyond their individual capabilities". The overall behaviour of such systems is not globally planned, but emerges as the aggregation of the actions taken by every agent in the community.

Each switch side processor (25) includes means for implementing a monitoring agent (MNA) (37) for monitoring new call records on the switch between the SSP (25) with which it is associated and the SCP (15). The monitoring agent (37) detects when an intelligent call is being made and communicates information relating to that call to the local call record database (CRDB) (27) stored in the switch side processor (25). Information in the CRDB (27) is communicated to the central database (33) using an updating mobile agent (39) that is able to move between the switch side processor (25) and the central database server (31). The updating mobile agent (UMA) (39) is provided for reading call record information from the local call record databases (27) and using that information to update the central database (33) in the central database server (31). The updating mobile agent may also be responsible for deleting local call records in the CRDBs (27) once the central database (33) has been up-dated.

In order to enable an operator to gain access to the information in the central database server (31), instructions are entered at the operator terminal (35) and then interpreted by an interface agent in the intelligent interface. The interface agent then constructs a query for the central database (33). When such a query is generated, the interface agent sends out a search mobile agent (SMA) (41) that can move between the operator interface (35) and the central database server (31) and search the central database (33) for billing information for the customer in question. In response to this search, a report building agent (RBA) (43), also able to move between the operator interface and the central database server (31), builds a report of the findings of the SMA (41), calculates the customer's bill and then presents the results to the operator.

Returning now to the monitoring agent (37), this monitors the call and places data into the local call record database (27) in the switch side processor (25) associated with the SSP (9). The monitoring agent (37) does this by monitoring signals intercepted by a link monitor located in the SSP. Alternatively, the link monitor could monitor the link at the SCP end, or anywhere between the SCP and the SSP.

Figure 5:
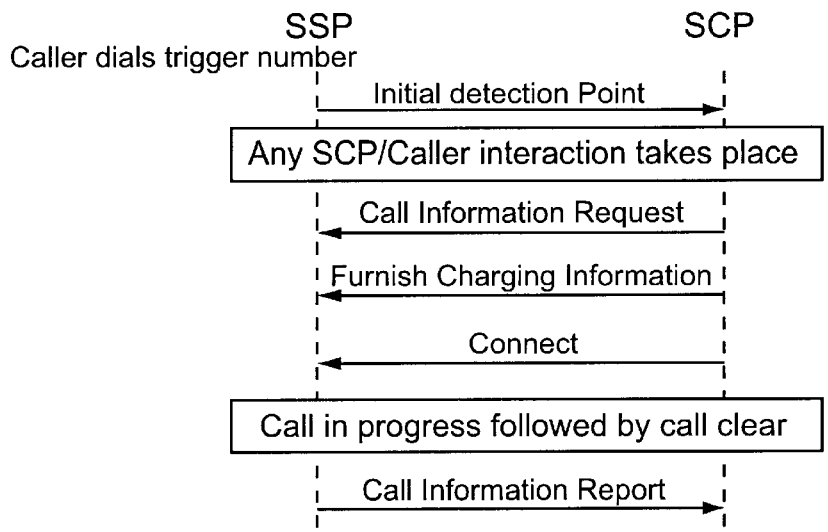
FIG. 5 illustrates message flow through a portion of the billing system of FIG. 4.

Typically, the signals passed between the SSP (9) and the SCP (15) use an intelligent network application protocol (INAP) that runs as the application layer on a C7 signalling stack. When a call is made on the network a trigger is generated. This occurs for example, on detection of the caller going off-hook, certain sequences of dialled digits, the called party being busy or not answering or a sequence of digits being dialled whilst the call is in the speech phase, or any surrounding features for a particular service e.g. features that prompt a user to enter digits such as a personal identification number (PIN). When the trigger point is reached, the SSP (9) suspends normal call processing and exports a number of parameters (such as service identity, dialled number, calling number, trigger detection point) to the SCP (15) in the initial detection point operation (IDP). The SCP (15) then sends an INAP connect message to the SSP (9) together with an INAP Furnish Charging Information message. This connects the call and requests the SSP (9) to create a billing record. The call then proceeds. At the end of the call, when the calling party clears the call, an INAP call information report message is sent from the SSP (9) to the SCP (15) to report the events requested in the call information request. The steps taken are shown in FIG. 5.

In order to monitor the call, INAP Call Information Request and Call Information Report messages may be used to record the following events:

Call attempt elapsed time

Call stop time

Call connected elapsed time

Called address

Release cause

Using the INAP, the monitoring agent can obtain real time details for the call by looking for hexadecimal operation codes for the Call Information Report, the Call Information Request and the Furnish Charging Information message with the same transaction identities. The basic message structure that the monitoring agent on the C7 link looks for is as follows:

MTP[SCCP[TCAP[INAP]]]

Each of the protocols represents a different level of the C7 signalling stack.

The transaction identity is located in the Transaction Capabilities Application Part (TCAP) portion of the C7 message. The monitoring agent would look for both origination and destination transaction identities by searching the following octet strings:

48 04 xx xx xx xx and 49 04 xx xx xx xx where "48" indicates origination and "49" indicates destination whilst the last four octets in both is the actual identity.

As well as searching for the above, the monitoring agent (37) would also look for the INAP octet strings associated with the Furnish Charging Information, Call Information Report and the Call Information Request which are as follows:

Furnish charging information: 02 01 22

Call information report: 02 01 2C

Call information request: 02 01 2D

Once the octet strings have been detected the remainder of the message can be decoded thus obtaining all the details required by the monitoring agent (37).

By monitoring the C7 link in this way, the monitoring agent is able to obtain the information needed for the billing record without having to poll the switch. The monitoring is being carried out as the calls are being made.

On completion of calls, the monitoring acent (37) then uses the updating mobile agent (39) to update the central call record database (CDB) (33) at regular intervals. Typically, the update would be made within five minutes of the call being made. This ensures that the central database (33) has a complete and largely up to date picture of the calls made using the switch. In this way, the call record database (33) is able to provide real time billing information. Hence, when an operator requests billing information from the system that information is up to date.

Figure 6:
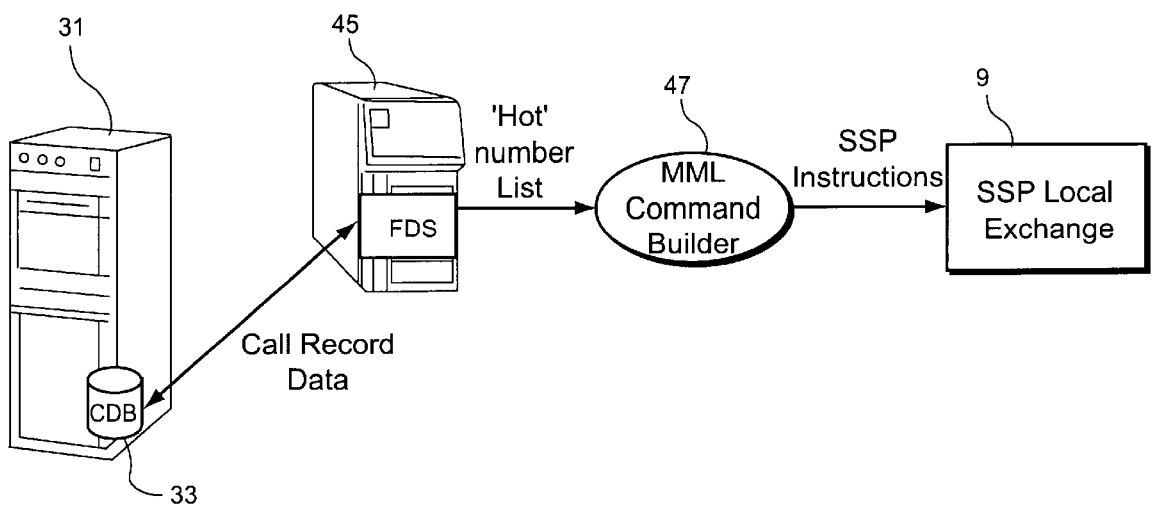
FIG. 6 is a schematic representation of a fraud detection system that can be used with the system shown in FIG. 4.

The billing system of FIG. 4 can be enhanced to include a fraud detection system (FDS) (45), as shown in FIG. 6.

In the arrangement of FIG. 6, the fraud detection system (45) (which may be a calls-analysis program running on a conventional computer) is connected to the central database server (31), so that it can readily access information in the central call database (33). This enables the FDS (45) to obtain up to date call information. It is the role of the FDS to analyse the call record data and to produce lists of numbers, or countries, to which it appears that fraudulent calls are being made. This "hot number list" is then sent to a man-machine-language command builder (MML) (47) that is able to instruct the SSPs (9) to stop calls to those numbers contained in the list, thereby preventing subsequent fraudulent calls.

Since the information in the central database (33) contains up to date details of all the calls made on the network, the FDS (45) is able to act promptly to analyse call information to determine whether or not fraudulent calls are being made, and accordingly react quickly when such calls are detected.

The billing system in which the invention is embodied provides an autonomous, dynamic billing system that enables billing queries to be responded to quickly and with minimum effort from the operator. This is because billing information is calculated constantly, as calls are completed, rather than periodically when a large amount of data has been gathered. This enables the operator of the billing system to query the billing information and to obtain up-to-date results, rather than receive data that is at least twenty-four hours out of date. The use of software agents ensures that the system is efficient and flexible.

A further advantage of the present invention is that the calculation of billing information is spread more uniformly through the day. Hence, this avoids the need to wait for a quiet time to poll the network for the required information. This is particularly advantageous nowadays as quiet times on the switches of telecommunications networks are diminishing significantly.

It is envisaged that customers may have direct access to the billing system in which the present invention is embodied, for example through the world wide web, so that they can personally obtain up to date information on the state of their account with the telecommunications service provider.

What is claimed is:

1. A billing system for a telecommunications network including a plurality of service switching points in communication with a service control point arranged to control network services, the system comprising:
    a respective call monitor at each of said service switching points arranged to monitor messages between the service control point and the respective monitored service switching point;
    a respective local database associated with each said call monitor for storing data derived from the monitored messages;
    a central database for storing call records relating to a plurality of said service switching points; and
    a mobile updating agent which can move between the central database and each of the local databases to transfer data from the local databases to the central database.

2. A billing system as claimed in claim 1 in which the messages comply with the C7 protocol, part of the International Standard SS7 signalling protocol.

3. A billing system as claimed in claim 1 including a remote operator interface for providing access to information in the central database.

4. A billing system as claimed in claim 3 in which the operator interface includes an interface agent for interpreting instructions from an operator and for constructing therefrom a query for the central database.

5. A billing system as claimed in claim 4 including a searching agent for searching for customer billing information in response to a query from an operator, and for producing a search output representative thereof.

6. A billing system as claimed in claim 5 in which the searching agent is mobile and can move between the operator interface and the central database.

7. A billing system as claimed in claim 5 including a report-building agent for building a report from the search output.

8. A billing system as claimed in claim 7 in which the report-building agent is mobile and can move between the operator interface and the central database.

9. A billing system as claimed in claim 1 including a fraud-detection system arranged to interrogate the central database, to determine a list of numbers to which possibly fraudulent calls have been made and to instruct the switching service points to block calls to the numbers in the list.

10. A method of providing real-time billing information in a telecommunications network, the network comprising a plurality of service switching points in communication with a service control point arranged to control network services, the method comprising:
    (a) monitoring messages passing between the service control point and each of the service switching points,
    (b) storing data derived from monitored messages in a respective local database for each of said service switching points; and
    (c) updating a central call records database with information indicative of monitored messages by transferring data from each of said local databases using a mobile updating agent.

11. A method as in claim 10 further comprising:
    (d) extracting data pertaining to a specific customer from said central call records database using a mobile searching agent, said mobile searching agent moving between the central call records database and an operator position.

12. A method as in claim 11 wherein said mobile searching agent is responsive to control information supplied from said operator position.

13. A method as in claim 11 further comprising:
    (e) building a report from data extracted by said mobile searching agent using a mobile report building agent, said mobile report building agent moving between said central call records database and said operator position.

14. A method as in claim 13 wherein said mobile searching agent is responsive to control information supplied from said operator position.

15. A billing system for a telecommunications network, the network comprising a plurality of service switching points in communication with a service control point arranged to control network services, the system comprising:
    (i) a respective call monitor at each of said service switching points arranged to monitor messages indicative of individual calls on the network, each of said messages passing between the service control point and one of the service switching points, each said respective call monitor storing information indicative of the monitored messages in a respective local call record database;
    (ii) a central database;
    (iii) a remote operator interface;
    (iv) a mobile updating agent arranged to update the central database from the information stored in each of said local call record databases;
    (v) a mobile searching agent responsive to a query from said operator interface for customer billing information to produce a search output in respect of said customer billing information; and
    (vi) a mobile report building agent for building reports from said search output;
    wherein said mobile searching agent and said mobile report building agent can each move between said operator interface and said central database, and said mobile updating agent can move between said central database and each of said local call record databases.

* * * * *